United States Patent [19]
Schaller

[11] 3,915,722
[45] Oct. 28, 1975

[54] COLORED GLASS COMPOSITIONS
[75] Inventor: Arnold L. Schaller, New Orleans, La.
[73] Assignee: Owens-Illinois, Inc., Toledo, Ohio
[22] Filed: Mar. 30, 1972
[21] Appl. No.: 239,723

Related U.S. Application Data
[63] Continuation of Ser. No. 883,230, Dec. 8, 1969, abandoned.

[52] U.S. Cl. .................................................. 106/52
[51] Int. Cl. ............................................... C03c 3/04
[58] Field of Search .......................... 106/52, 54, 48

[56] References Cited
UNITED STATES PATENTS

| | | | |
|---|---|---|---|
| 1,411,134 | 3/1922 | Taylor.................................... | 106/52 |
| 2,923,635 | 2/1960 | Beck et al.............................. | 106/52 |
| 3,203,816 | 8/1965 | Bull et al. .............................. | 106/54 |
| 3,291,621 | 12/1966 | Hagedorn .............................. | 106/52 |
| 3,351,475 | 11/1967 | Hagedorn .............................. | 106/52 |
| 3,481,750 | 12/1969 | Swain..................................... | 106/52 |
| 3,482,955 | 12/1969 | Monks................................... | 106/52 |

OTHER PUBLICATIONS
Weyl, W. *Coloured Glasses*–Sheffield Eng., 1951 pp. 116–117, 123, 130–131, 136–137.
Volf, M. *Technical Glasses*–(1961) London, pg. 438.
Ceramic Industry–1967 Handbook of Materials for Ceramic Processing, p. 50 "Cerium Oxide," Jan. 1967.

*Primary Examiner*—Winston A. Douglas
*Assistant Examiner*—John F. Niebling
*Attorney, Agent, or Firm*—Richard B. Dence; E. J. Holler

[57] ABSTRACT

Colored silicate glass compositions particularly in the form of frit containing chromium oxide and manganese oxide and wherein the ratio of manganese to chromium is expressed on the basis of a weight ratio of manganous oxide, MnO, to chromic oxide, $Cr_2O_3$, and ranges from 13.6:1 to 1:1. The compositions can be used for manufacturing a variety of glass articles of commerce and may be used as frit colorant additions for coloring essentially colorless base glasses.

14 Claims, No Drawings

COLORED GLASS COMPOSITIONS

REFERENCE TO A RELATED APPLICATION

This application is a continuation of my copending application Ser. No. 883,230, filed Dec. 8, 1969 and now abandoned, the entire disclosure of which is relied on.

BACKGROUND OF THE INVENTION

The present invention relates to colored glass compositions containing silica which are suitable for manufacturing colored glass articles of commerce and science, and, especially, for use as colorant frit additions to essentially colorless base glass.

Colored glass compositions are needed in the glass art that possess utility for fabricating colored glass articles and also possess utility as colorant frits for addition to a colorless base glass to form colored glasses which in turn are suitable for fabricating colored glass articles. The present invention satisfies this need by making available to the art certain glass compositions as described hereinafter.

The glass compositions of the invention are formulated from a unique mixture of select reagents to produce colored glasses suitable for direct use and for use as a colorant glass frit. Glass compositions of this invention have important advantages over the prior art glasses because small batches can be made of the colored glass compositions for manufacture of colored glass articles on a limited scale; or, if desired, a colorant frit can be prepared for addition to and admixture with a molten stream of a clear base glass.

Frit addition, as is known in the art, is accomplished by flowing a clear base glass from a glass furnace through a forehearth channel, mixing in the frit and withdrawing the composite newly formed colored glass from the forehearth channel to form glass mold charges. The mold charges are used in the manufacture of shaped glass articles such as colored glass bottles, colored drinking glasses, colored ashtrays and the like.

The colorant glass frit used in the forehearth addition technique greatly facilitates and expedites making changes in the color of the ulitmate glass. Thus, the forehearth technique makes it possible to effect a change in color in a matter of a few hours instead of the long periods of time required for changing of colors in the glass melting furnace.

Prior to this invention, the frit available for simulating certain colors, for example, amber, from colorless flint type glasses were frits containing as colorants iron oxides and manganese oxides which inherently limited the usefulness of said frit.

Accordingly, it is an immediate object of the present invention to overcome the limitations and shortcomings associated with the prior art compositions of matter.

Another object of the present invention is to provide novel glass compositions suitable for making glassware.

Yet another object of the invention is to provide a colorant frit composition for adding to a base glass.

Yet still a further object of this invention is to provide a variety of colored glasses from a colorless glass by the addition of a colorant frit to the base glass.

These and other objects, features and advantages of the present invention will become readily apparent to one skilled in the art from the following detailed description thereof.

SUMMARY OF THE INVENTION

The invention concerns glass compositions consisting essentially of:

|  | Percent by Weight |
| --- | --- |
| $SiO_2$ | 42 to 56 |
| $Fe_2O_3$ | 0.5 to 1.5 |
| CaO | 0.1 to 1 |
| MgO | 0 to 0.5 |
| $Na_2O$ | 15 to 25 |
| $K_2O$ | 1.0 to 1.5 |
| $Cr_2O_3$ | 1.5 to 2.8 |
| MnO | 12 to 30 |
| $CeO_2$ | 1.5 to 2.8 |

In another embodiment, the glasses of the invention consist essentially of:

|  | Percent by Weight |
| --- | --- |
| $SiO_2$ | 42 to 56 |
| $Al_2O_3$ | 0.1 to 0.5 |
| $Fe_2O_3$ | 0.5 to 1.5 |
| CaO | 0.1 to 1 |
| MgO | 0 to 0.5 |
| $Na_2O$ | 15 to 25 |
| $K_2O$ | 1 to 5 |
| MnO | 12 to 30 |
| $CeO_2$ | 1 to 2.5 |
| $Cr_2O_3$ | 1.5 to 2.8 |
| $La_2O_3$ | 0.1 to 0.5 |
| F | 0.1 to 0.2 |
| BaO | 0.01 to 0.1 |
| $Pr_6O_8$ | 0.01 to 0.1 |
| $Nd_2O_3$ | 0.01 to 0.2 |

In a still further embodiment, the glasses of the invention consist essentially of:

|  | Percent by Weight |
| --- | --- |
| $SiO_2$ | 65 to 75 |
| $Fe_2O_3$ | 0.1 to 0.5 |
| CaO | 0 to 4 |
| MgO | 0 to 0.3 |
| $Na_2O$ | 15 to 25 |
| $K_2O$ | 1 to 2 |
| $Cr_2O_3$ | 1.5 to 2.8 |
| MnO | 2 to 8 |
| $Al_2O_3$ | 0 to 0.2 |
| $CrO_3$ | 0 to 0.4 |

DETAILED DESCRIPTION OF THE INVENTION

In attaining the objects and advantages of the present invention, it has now been unexpectedly found that novel compositions of matter can be obtained by intimately mixing selected glass-forming ingredients to give the desired colored glasses or the desired colorant glass frits. Further in accordance with the present invention, there are provided glass compositions that contain a combination of chromium and manganese intimately and homogeneously blended with other selected glass-forming oxides to give the desired novel compositions. The combination of chromium and manganese yields glasses of various colors or shades of glasses from yellow-amber through amber, purple and black. The present glasses use chrome oxide, $CrO_3$, i.e., the hexavalent form of chromium, as an oxidizing agent for manganese oxide, to keep manganese oxide in a fully oxidized state, $Mn_2O_3$. The ratio of the chromium oxides and manganese oxides in the glasses is from a ratio of 13.6/1 to 1/1 wherein manganese is expressed as MnO over chromium with the chromium expressed as $Cr_2O_3$. Exemplary of specific ratios of glass melts are the ratio of $MnO/Cr_2O_3$, which was 13.6/1; 9.23/1; 6.2/1; 4/1; 2/1; 1.75/1; 1.5/1; and 1/1. In most of the melts prepared, the concentration of the $Cr_2O_3$ was held at a range of 1.5 to 2.8%, with the usual amount of 2.0% used for the average melt.

Exemplary of glasses prepared within the spirit of the present invention are the following:

A glass containing:

|  | Percent by Weight |
| --- | --- |
| $SiO_2$ | 42 to 56 |
| $Fe_2O_3$ | 0.5 to 1.5 |
| CaO | 0.1 to 1 |
| MgO | 0.0 to 0.5 |
| $Na_2O$ | 15 to 25 |
| $K_2O$ | 1 to 1.5 |
| $Cr_2O_3$ | 1.5 to 2.8 |
| MnO | 12 to 30 |
| $CeO_2$ | 1.5 to 2.8 |

A glass consisting essentially of:

|  | Percent by Weight |
| --- | --- |
| $SiO_2$ | 42 to 56 |
| $Al_2O_3$ | 0.1 to 0.5 |
| $Fe_2O_3$ | 0.5 to 1.5 |
| CaO | 0.1 to 1 |
| MgO | 0 to 0.5 |
| $Na_2O$ | 15 to 25 |
| $K_2O$ | 1 to 5 |
| MnO | 12 to 30 |
| $CeO_2$ | 1 to 2.5 |
| $Cr_2O_3$ | 1.5 to 2.8 |
| $La_2O_3$ | 0.1 to 0.5 |
| F | 0.1 to 0.2 |
| BaO | 0.01 to 0.1 |
| $Pr_6O_8$ | 0.01 to 0.1 |
| $Nd_2O_3$ | 0.01 to 0.2 |

A glass consisting essentially of:

|  | Percent by Weight |
| --- | --- |
| $SiO_2$ | 65 to 75 |
| $Fe_2O_3$ | 0.1 to 0.5 |
| CaO | 0 to 4 |
| MgO | 0 to 0.3 |
| $Na_2O$ | 15 to 25 |
| $K_2O$ | 1 to 2 |
| $Cr_2O_3$ | 1.5 to 2.8 |
| MnO | 2 to 8 |
| $Al_2O_3$ | 0 to 0.2 |
| $CrO_3$ | 0 to 0.4 |

Generally, when frits were desired, the frit samples were about 200 grams batch weight and they were melted in a platinum crucible for about one hour at 2400° F. in an air atmosphere. In large production runs, the melt was in an electric furnace, and the temperature as measured in the refiner was about 2300° to 2500° F. The atmosphere of the refiner of the furnace was approximately neutral. Some samples were melted for varying periods of time to determine if prolonged melting destroyed the color. For example, some sample melts were melted in a drop hearth electric furnace for periods of one-half hour to 12 hours. The sample glass was then fritted or crushed and added to a commercially available flint glass and remelted for three-quarter hours to 24 hours. The sample was then poured and annealed. There was no loss of color in the desired glasses as a result of the heating for prolonged times. The general melting conditions and procedures for making molten glass are conventional and such conditions are well known to those skilled in the art as set forth in Tooley's "Handbook of Glass Manufacturing", Ogden Publishing Company, New York 36, N.Y. 1953 at pages 242–245.

EXAMPLES OF SPECIFIC BATCH AND SPECIFIC GLASSES

The following batch ingredients were used to form a composite glass:

EXAMPLE 1

| Ingredients | Pounds |
| --- | --- |
| Sand | 2000 |
| Soda | 1473 |
| Cerium Concentrate | 155 |
| Manganese Ore | 1755 |
| Potassium Dichromate | 176 |

All the ingredients used for preparing the glass are commercially available. The cerium concentrate, when used for making a glass, is available from the Molybdenum Corporation and, in addition to $CeO_2$, it contains $La_2O_3$, F, BaO, $Pr_6O_8$, $Al_2O_3$ and $Nd_2O_3$. It will be apparent from the above that the cerium concentrate is an optional ingredient. The amounts present are set forth in the reported analysis. The manganese ore is available from the Calumite Company and it often contains trace amounts of $SiO_2$, $Fe_2O_3$, $Al_2O_3$ and CaO in addition to the MnO. The amounts present are set forth in the glass.

The theoretical glass composition which was produced by melting the above batch is as follows:

| Ingredients | Percent |
| --- | --- |
| $SiO_2$ | 45.4 |
| $Fe_2O_3$ | 1.24 |
| CaO | 0.71 |
| MgO | 0.10 |
| $Na_2O$ | 18.88 |
| $K_2O$ | 1.24 |
| $Cr_2O_3$ | 2.01 |
| MnO | 27.30 |
| $CeO_2$ | 2.06 |
| $Al_2O_3$ | 0.41 |
| $La_2O_3$ | 0.31 |
| F | 0.12 |
| BaO | 0.07 |
| $Pr_6O_8$ | 0.04 |
| $Nd_2O_3$ | 0.14 |

The glass has a theoretical ratio of $MnO/Cr_2O_3$ of 13.6. It will be seen from the above that this ratio is arrived at by dividing the weight percent MnO by the weight percent $Cr_2O_3$ on a theoretical basis. Thus, the ratio is a weight percent ratio. As will be apparent from the examples hereinbelow, the ratio of $MnO/Cr_2O_3$, set forth in each of the following examples, is obtained as explained above. The glass can be charged into a glass forming mold for making an article of manufacture, such as a pressed ash tray, or the glass can be employed as a frit and added to a flint glass and then charged into a glass forming mold for making an article such as a bottle or the like.

EXAMPLE 2

Another glass prepared according to the spirit of the invention is as follows:

| Ingredients | Pounds |
| --- | --- |
| Sand | 2000 |
| Soda ash | 1473 |
| Cerium concentrate (CeO$_2$) | 155 |
| Manganese ore (MnO) | 1200 |
| Potassium dichromate | 176 |

The theoretical composition of the above glass was as follows:

| Ingredients | Percent |
| --- | --- |
| SiO$_2$ | 49.70 |
| Fe$_2$O$_3$ | 0.95 |
| CaO | 0.60 |
| MgO | 0.11 |
| Na$_2$O | 20.96 |
| K$_2$O | 1.38 |
| Cr$_2$O$_3$ | 2.28 |
| MnO | 20.73 |
| CeO$_2$ | 2.23 |
| Al$_2$O$_3$ | 0.30 |
| La$_2$O$_3$ | 0.34 |
| F | 0.14 |
| BaO | 0.07 |
| Pr$_6$O$_8$ | 0.05 |
| Nd$_2$O$_3$ | 0.16 |

The glass had a theoretical ratio of MnO/Cr$_2$O$_3$ of 9.1.

EXAMPLE 3

The following commercially available reagents were blended together for preparing a composition of matter:

| Ingredients | Pounds |
| --- | --- |
| Sand | 2000 |
| Soda ash | 1473 |
| Cerium concentrate | 155 |
| Manganese ore | 800 |
| Potassium dichromate | 176 |

The theoretical composition of the glass prepared from this batch is as follows:

| Ingredients | Percent |
| --- | --- |
| SiO$_2$ | 53.45 |
| Fe$_2$O$_3$ | 0.69 |
| CaO | 0.49 |
| MgO | 0.12 |
| Na$_2$O | 22.78 |
| K$_2$O | 1.50 |
| Cr$_2$O$_3$ | 2.43 |
| MnO | 15.01 |
| CeO$_2$ | 2.48 |
| Al$_2$O$_3$ | 0.22 |
| La$_2$O$_3$ | 0.37 |
| F | 0.15 |
| BaO | 0.08 |
| Pr$_6$O$_8$ | 0.05 |
| Nd$_2$O$_3$ | 0.17 |

The glass had a MnO/Cr$_2$O$_3$ ratio of 6.2.

EXAMPLE 4

A glass was prepared from the following:

| Ingredients | Pounds |
| --- | --- |
| Sand | 2000 |
| Soda ash | 893 |
| Manganese ore | 312 |
| Potassium dichromate | 106 |

The theoretical composition of the glass prepared from this batch is as follows:

| Ingredients | Percent |
| --- | --- |
| SiO$_2$ | 69.8 |
| Fe$_2$O$_3$ | 0.36 |
| CaO | 0.41 |
| MgO | 0.16 |
| Na$_2$O | 18.26 |
| K$_2$O | 1.20 |
| Cr$_2$O$_3$ | 1.94 |
| MnO | 7.74 |

This glass had a theoretical MnO/Cr$_2$O$_3$ ratio of 4.

EXAMPLE 5

In the present example, the following batch reagents were prepared for forming a glass:

| Ingredients | Pounds |
| --- | --- |
| Sand | 2000 |
| Soda ash | 893 |
| Lime | 87 |
| Manganese ore | 156 |
| Potassium dichromate | 106 |

This glass had a theoretical MnO/Cr$_2$O$_3$ ratio of 2.0 and a theoretical composition as follows:

| Ingredients | Percent |
| --- | --- |
| SiO$_2$ | 72.80 |
| Fe$_2$O$_3$ | 0.19 |
| CaO | 2.08 |
| MgO | 0.17 |
| Na$_2$O | 18.79 |
| K$_2$O | 1.23 |
| Cr$_2$O$_3$ | 1.99 |
| MnO | 3.98 |

EXAMPLE 6

| Ingredients | Pounds |
| --- | --- |
| Sand | 2000 |
| Soda ash | 893 |
| Lime | 174 |
| Manganese ore | 78 |
| Potassium dichromate | 106 |

This batch gave a glass with a theoretical MnO/Cr$_2$O$_3$ ratio of 1 and the glass with composition as follows:

| Ingredients | Percent |
| --- | --- |
| SiO$_2$ | 71.74 |
| Fe$_2$O$_3$ | 0.10 |
| CaO | 3.80 |
| MgO | 0.19 |
| Na$_2$O | 18.88 |

-Continued

| Ingredients | Percent |
| --- | --- |
| K₂O | 1.24 |
| Cr₂O₃ | 2.00 |
| MnO | 2.00 |

EXAMPLE 7

The following example further demonstrates the spirit of the invention:

| Ingredients | Pounds |
| --- | --- |
| Sand | 2000 |
| Soda ash | 1046.7 |
| Manganese ore | 146.7 |
| Potassium dichromate | 133.3 |

This batch gave a glass with a theoretical $MnO/Cr_2O_3$ ratio of 1.5 and a composition as follows:

| Ingredients | Percent |
| --- | --- |
| SiO₂ | 70.06 |
| Al₂O₃ | 0.06 |
| CaO | 0.33 |
| MgO | 0.16 |
| Na₂O | 21.57 |
| K₂O | 1.52 |
| Fe₂O₃ | 0.17 |
| Cr₂O₃ | 2.45 |
| MnO | 3.67 |

EXAMPLE 8

A base flint glass was prepared by mixing and melting batch set forth immediately below:

| Ingredients | Pounds |
| --- | --- |
| Sand | 1989.9 |
| Soda ash | 656.0 |
| Blast furnace slag | 80.0 |
| Feldspar | 214.0 |
| Lime | 593.0 |
| Salt cake | 15.0 |
| Niter (NaNO₃) | 0.8 |

A glass produced from the above batch was mixed with a fritted glass, remelted for three-quarter hours to give an amber color glass. The frit added to the flint glass consists of 70.06 percent by weight SiO₂; 0.06 percent by weight Al₂O₃; 0.33 percent by weight CaO; 0.16 percent by weight MgO; 21.57 percent by weight Na₂O; 1.52 percent by weight K₂O; 0.17 percent by weight Fe₂O₃; 2.45 percent by weight Cr₂O₃; and 3.67 percent by weight MnO.

EXAMPLE 9

As essentially colorless flint glass was prepared for mixing with a frit prepared according to the invention, the batch materials for the flint glass were as follows:

| Ingredients | Pounds |
| --- | --- |
| Sand | 1998.47 |
| Soda ash | 380.48 |
| Blast furnace slag | 74.1 |

-Continued

| Ingredients | Pounds |
| --- | --- |
| Feldspar | 207.5 |
| Lime | 332.59 |
| Salt cake | 6.6 |
| Niter | 0.24 |

The final melt glass, prepared from the above batch, consists of the following oxides:

| Ingredients | Percent |
| --- | --- |
| SiO₂ | 72.05 |
| TiO₂ | 0.02 |
| SeO₂ | 0.001 |
| Al₂O₃ | 1.72 |
| Fe₂O₃ | 0.04 |
| CaO | 11.99 |
| MgO | 0.45 |
| Na₂O | 13.33 |
| K₂O | 0.35 |
| P₂O₅ | 0.002 |

A frit was added to the above glass to produce an oxidized amber glass by forehearth addition technique. The colored flint glass produced was molded by conventional glass techniques into glass bottles. The frit glass used for this production run consists essentially of 70.06 weight percent SiO₂; 0.06 weight percent Al₂O₃; 0.33 weight percent CaO; 0.16 weight percent MgO; 21.57 weight percent Na₂O; 1.52 weight percent K₂O; 0.17 weight percent Fe₂O₃; 2.45 weight percent Cr₂O₃; and 3.67 weight percent MnO.

As will be apparent from the foregoing examples, those compositions which are made from batch ingredients, not including the cerrium concentrate of Example 1, have the following range of ingredients:

| Ingredients | Weight Percent |
| --- | --- |
| SiO₂ | 69.8 – 72.8 |
| Fe₂O₃ | 0.10 – 0.36 |
| CaO | 0.33 – 3.80 |
| MgO | 0.16 – 0.19 |
| Na₂O | 18.26 – 21.57 |
| K₂O | 1.20 – 1.52 |
| Cr₂O₃ | 1.94 – 2.45 |
| MnO | 2.00 – 7.74 |
| Al₂O₃ | 0 – 0.06 |

The foregoing ranges are based on Examples 4, 5, 6 and 7. It will be seen from Examples 4, 5, 6 and 7 that the ratio of $MnO/Cr_2O_3$ ranges from 1 to 4.

Compositions of the foregoing examples prepared from batches containing the cerium concentrate of Example 1 have the following range of ingredients:

| Ingredients | Weight Percent |
| --- | --- |
| SiO₂ | 45.4 – 53.56 |
| Fe₂O₃ | 0.36 – 1.24 |
| CaO | 0.49 – 0.71 |
| MgO | 0.10 – 0.12 |
| Na₂O | 18.88 – 22.86 |
| K₂O | 1.21 – 1.50 |
| Cr₂O₃ | 2.00 – 2.43 |
| MnO | 14.94 – 27.3 |
| CeO₂ | 2.01 – 2.48 |
| Al₂O₃ | 0 – 0.41 |
| La₂O₃ | 0 – 0.37 |
| F | 0 – 0.15 |
| BaO | 0 – 0.08 |
| Pr₆O₈ | 0 – 0.05 |
| Nd₂O₃ | 0 – 0.17 |

The foregoing ranges are based on Examples 1, 2 and 3. It will be seen from Examples 1, 2 and 3 that the ratio of $MnO/Cr_2O_3$ ranges from 6.2 to 13.6.

In the next three examples 10, 11, and 12, the ingredients employed were as in Examples 1, 2 and 3, except that, oxides, for example, cerium oxide, was employed for the abovestated ingredients. All glass-forming conditions were as described above.

EXAMPLE IN WEIGHT PERCENT

| Ingredients | 10 | 11 | 12 |
|---|---|---|---|
| $SiO_2$ | 45.49 | 49.81 | 53.56 |
| $Fe_2O_3$ | 1.24 | 0.94 | 0.69 |
| CaO | 0.71 | 0.60 | 0.49 |
| MgO | 0.10 | 0.11 | 0.12 |
| $Na_2O$ | 18.97 | 21.05 | 22.86 |
| $K_2O$ | 1.21 | 1.34 | 1.46 |
| MnO | 27.20 | 20.64 | 14.94 |
| $CeO_2$ | 2.01 | 2.23 | 2.42 |
| $Cr_2O_3$ | 2.00 | 2.22 | 2.41 |
| Ratio $MnO/Cr_2O_3$ | 13.6 | 9.3 | 6.2 |

As will be seen from Examples 10, 11 and 12, the compositions of these three examples fall within the following ranges (in weight percent):

| Ingredients | Weight Percent |
|---|---|
| $SiO_2$ | 45.49 – 53.56 |
| $Fe_2O_3$ | 0.69 – 1.24 |
| CaO | 0.49 – 0.71 |
| MgO | 0.10 – 0.12 |
| $Na_2O$ | 18.97 – 22.86 |
| $K_2O$ | 1.21 – 1.46 |
| $Cr_2O_3$ | 2.00 – 2.41 |
| MnO | 14.94 – 27.2 |
| $CeO_2$ | 2.01 – 2.42 |

The ratio of MnO to $Cr_2O_3$ in these three examples ranges from 6.2 to 13.6.

It will be seen from all the examples in this case that the ratio of MnO to $Cr_2O_3$ is expressed as a weight percent ratio.

The invention has use for the fabrication of conventional articles like glass jars, bottles, ash trays, tumblers and the like. And, while operative embodiments have been described herein in detail it is to be understood that modifications may be made without departing from the scope of the invention as set fourth in the specification.

I claim:

1. A colorant glass frit composition consisting essentially of the following glass-forming oxides in the indicated percentages by weight:

| | Percent by Weight |
|---|---|
| $SiO_2$ | 45.49 to 53.56 |
| $Fe_2O_3$ | 0.69 to 1.24 |
| CaO | 0.49 to 0.71 |
| MgO | 0.10 to 0.12 |
| $Na_2O$ | 18.97 to 22.86 |
| $K_2O$ | 1.21 to 1.46 |
| $Cr_2O_3$ | 2 to 2.41 |
| MnO | 14.94 to 27.2 |
| $CeO_2$ | 2.01 to 2.42. |

2. A glass composition according to claim 1 wherein the glass consists essentially of:

| | Percent by Weight |
|---|---|
| $SiO_2$ | 45.5 |
| $Fe_2O_3$ | 1.24 |
| CaO | 0.71 |
| MgO | 0.10 |
| $Na_2O$ | 18.97 |
| $K_2O$ | 1.21 |
| $Cr_2O_3$ | 2.0 |
| MnO | 27.2 |
| $CeO_2$ | 2.01 | and wherein the ratio of MnO to $Cr_2O_3$ is 13.6 to 1.

3. A glass composition according to claim 1 wherein the glass consists essentially of:

| | Percent by Weight |
|---|---|
| $SiO_2$ | 49.8 |
| $Fe_2O_3$ | 0.94 |
| CaO | 0.6 |
| MgO | 0.1 |
| $Na_2O$ | 21.05 |
| $K_2O$ | 1.34 |
| $Cr_2O_3$ | 2.2 |
| MnO | 20.64 |
| $CeO_2$ | 2.2 | and wherein the ratio of MnO to $Cr_2O_3$ is 9.3 to 1.

4. A glass composition according to claim 1 wherein the glass consists essentially of:

| | Percent by Weight |
|---|---|
| $SiO_2$ | 53.6 |
| $Fe_2O_3$ | 0.7 |
| CaO | 0.5 |
| MgO | 0.12 |
| $Na_2O$ | 22.86 |
| $K_2O$ | 1.46 |
| $Cr_2O_3$ | 2.41 |
| MnO | 14.9 |
| $CeO_2$ | 2.4 | and wherein the ratio of MnO to $Cr_2O_3$ is 6.2 to 1.

5. A colorant glass frit composition consisting essentially of the following glass-forming oxides in the indicated percentages by weight:

| | Percent by Weight |
|---|---|
| $SiO_2$ | 69.8 to 72.8 |
| $Fe_2O_3$ | 0.1 to 0.36 |
| CaO | 0.33 to 3.8 |
| MgO | 0.16 to 0.19 |
| $Na_2O$ | 18.26 to 21.57 |
| $K_2O$ | 1.2 to 1.52 |
| $Cr_2O_3$ | 1.94 to 2.45 |
| MnO | 2.0 to 7.74 |
| $Al_2O_3$ | 0 to 0.06 | wherein $Cr_2O_3$ is added as potassium dichromate and wherein the ratio of MnO to $Cr_2O_3$ ranges from 1 to 4.

6. A glass composition according to claim 5 wherein the glass consists essentially of:

| | Percent by Weight |
|---|---|
| $SiO_2$ | 69.8 |
| $Fe_2O_3$ | 0.4 |
| CaO | 0.4 |
| MgO | 0.16 |
| $Na_2O$ | 18.26 |
| $K_2O$ | 1.2 |
| $Cr_2O_3$ | 1.94 |
| MnO | 7.74 | and wherein the ratio of MnO to $Cr_2O_3$ is 4 to 1.

7. A glass composition according to claim 5 wherein the glass consists essentially of:

|  | Percent by Weight |
|---|---|
| $SiO_2$ | 72.8 |
| $Fe_2O_3$ | 0.2 |
| CaO | 2.1 |
| MgO | 0.17 |
| $Na_2O$ | 18.79 |
| $K_2O$ | 1.23 |
| $Cr_2O_3$ | 1.99 |
| MnO | 3.98 | and wherein the ratio of MnO to $Cr_2O_3$ is 2 to 1.

8. A glass composition according to claim 5 wherein the glass consists essentially of:

|  | Percent by Weight |
|---|---|
| $SiO_2$ | 71.74 |
| $Fe_2O_3$ | 0.1 |
| CaO | 3.8 |
| MgO | 0.2 |
| $Na_2O$ | 18.88 |
| $K_2O$ | 1.24 |
| $Cr_2O_3$ | 2.0 |
| MnO | 2.0 | and wherein the ratio of MnO to $Cr_2O_3$ is 1 to 1.

9. A glass composition according to claim 5 wherein the glass consists essentially of:

|  | Percent by Weight |
|---|---|
| $SiO_2$ | 70.1 |
| $Al_2O_3$ | 0.1 |
| CaO | 0.3 |
| MgO | 0.2 |
| $Na_2O$ | 21.57 |
| $K_2O$ | 1.5 |
| $Fe_2O_3$ | 0.2 |
| $Cr_2O_3$ | 2.45 |
| MnO | 3.67 | and wherein the ratio of MnO to $Cr_2O_3$ is 1.5 to 1.

10. A glass composition consisting essentially of the following oxides in the indicated percentages by weight:

|  | Percent by Weight |
|---|---|
| $SiO_2$ | 42 to 56 |
| $Al_2O_3$ | 0.1 to 0.5 |
| $Fe_2O_3$ | 0.5 to 1.5 |
| CaO | 0.1 to 1 |
| MgO | 0.1 to 0.5 |
| $Na_2O$ | 15 to 25 |
| $K_2O$ | 1 to 5 |
| MnO | 12 to 30 |
| $CeO_2$ | 1 to 2.5 |
| $Cr_2O_3$ | 1.5 to 2.8 |
| $La_2O_3$ | 0.1 to 0.5 |
| F | 0.1 to 0.2 |
| BaO | 0.01 to 0.1 |
| $Pr_6O_8$ | 0.01 to 0.1 |
| $Nd_2O_3$ | 0.01 to 0.2 | and wherein the ratio of MnO to $Cr_2O_3$ ranges from 6.2 to 13.6.

11. A colorant glass frit composition consisting essentially of the following oxides in the indicated percentages by weight:

|  | Percent by Weight |
|---|---|
| $SiO_2$ | 45.4 to 53.56 |
| $Fe_2O_3$ | 0.36 to 1.24 |
| CaO | 0.49 to 0.71 |
| MgO | 0.10 to 0.12 |
| $Na_2O$ | 18.88 to 22.86 |
| $K_2O$ | 1.21 to 1.50 |
| $Cr_2O_3$ | 2 to 2.43 |
| MnO | 14.94 to 27.3 |
| $CeO_2$ | 2.01 to 2.48 |
| $Al_2O_3$ | 0 to 0.41 |
| $La_2O_3$ | 0 to 0.37 |
| F | 0 to 0.15 |
| BaO | 0 to 0.08 |
| $Pr_6O_8$ | 0 to 0.05 |
| $Nd_2O_3$ | 0 to 0.17 | and wherein the ratio of MnO to $Cr_2O_3$ ranges from 6.2 to 13.6.

12. A glass composition according to claim 10 wherein the glass consists essentially of:

|  | Percent by Weight |
|---|---|
| $SiO_2$ | 45.4 |
| $Al_2O_3$ | 0.41 |
| $Fe_2O_3$ | 1.24 |
| CaO | 0.71 |
| MgO | 0.10 |
| $Na_2O$ | 18.88 |
| $K_2O$ | 1.24 |
| MnO | 27.30 |
| $CeO_2$ | 2.06 |
| $Cr_2O_3$ | 2.01 |
| $La_2O_3$ | 0.31 |
| F | 0.12 |
| BaO | 0.07 |
| $Pr_6O_8$ | 0.04 |
| $Nd_2O_3$ | 0.14. |

13. A glass composition according to claim 10 wherein the glass consists essentially of:

|  | Percent by Weight |
|---|---|
| $SiO_2$ | 49.70 |
| $Al_2O_3$ | 0.30 |
| $Fe_2O_3$ | 0.95 |
| CaO | 0.60 |
| MgO | 0.11 |
| $Na_2O$ | 20.96 |
| $K_2O$ | 1.38 |
| MnO | 20.73 |
| CeO | 2.23 |
| $Cr_2O_3$ | 2.28 |
| $La_2O_3$ | 0.34 |
| F | 0.14 |
| BaO | 0.07 |
| $Pr_6O_8$ | 0.05 |
| $Nd_2O_3$ | 0.16. |

14. A glass composition according to claim 10 wherein the glass consists essentially of:

|  | Percent by Weight |
|---|---|
| $SiO_2$ | 53.45 |
| $Al_2O_3$ | 0.22 |
| $Fe_2O_3$ | 0.69 |
| CaO | 0.49 |
| MgO | 0.12 |
| $Na_2O$ | 22.78 |
| $K_2O$ | 1.50 |
| MnO | 15.01 |
| $CeO_2$ | 2.48 |
| $Cr_2O_3$ | 2.43 |
| $La_2O_3$ | 0.37 |
| F | 0.15 |
| BaO | 0.08 |
| $Pr_6O_8$ | 0.05 |
| $Nd_2O_3$ | 0.17. |

* * * * *

UNITED STATES PATENT AND TRADEMARK OFFICE
CERTIFICATE OF CORRECTION

PATENT NO. : 3,915,722
DATED : Oct. 28, 1975
INVENTOR(S) : A. L. Schaller

It is certified that error appears in the above-identified patent and that said Letters Patent are hereby corrected as shown below:

Col. 12, line 42 (approximately) "CeO" should be --$CeO_2$--.

Signed and Sealed this

Third Day of May 1977

[SEAL]

Attest:

RUTH C. MASON
Attesting Officer

C. MARSHALL DANN
Commissioner of Patents and Trademarks